United States Patent
Magdych et al.

(10) Patent No.: US 7,146,642 B1
(45) Date of Patent: Dec. 5, 2006

(54) SYSTEM, METHOD AND COMPUTER PROGRAM PRODUCT FOR DETECTING MODIFICATIONS TO RISK ASSESSMENT SCANNING CAUSED BY AN INTERMEDIATE DEVICE

(75) Inventors: James S. Magdych, Chino, CA (US); Tarik Rahmanovic, Germantown, MD (US); John R. McDonald, Jacksonville, FL (US); Brock E. Tellier, Stamford, CT (US); Anthony C. Osborne, Sydney (AU); Nishad P. Herath, Sydney (AU)

(73) Assignee: McAfee, Inc., Santa Clara, CA (US)

( * ) Notice: Subject to any disclaimer, the term of this patent is extended or adjusted under 35 U.S.C. 154(b) by 799 days.

(21) Appl. No.: 09/895,498

(22) Filed: Jun. 29, 2001

(51) Int. Cl.
*G06F 12/14* (2006.01)
*G06F 11/30* (2006.01)
*G06F 15/18* (2006.01)
*G08B 23/00* (2006.01)

(52) U.S. Cl. .............................. 726/22; 726/23; 726/24; 726/25

(58) Field of Classification Search ................ 713/201; 726/22, 23, 24, 25
See application file for complete search history.

(56) References Cited

U.S. PATENT DOCUMENTS

| | | | | |
|---|---|---|---|---|
| 5,502,815 | A * | 3/1996 | Cozza | 714/38 |
| 5,960,087 | A * | 9/1999 | Tribble et al. | 713/167 |
| 5,960,170 | A * | 9/1999 | Chen et al. | 714/38 |
| 6,108,583 | A | 8/2000 | Schneck et al. | 700/9 |
| 6,279,113 | B1 * | 8/2001 | Vaidya | 726/23 |
| 6,298,445 | B1 * | 10/2001 | Shostack et al. | 713/201 |
| 6,449,645 | B1 * | 9/2002 | Nash | 709/224 |
| 6,549,972 | B1 * | 4/2003 | Berstis et al. | 710/311 |
| 6,578,069 | B1 * | 6/2003 | Hopmann et al. | 709/203 |
| 6,661,791 | B1 * | 12/2003 | Brown | 370/392 |
| 6,681,213 | B1 * | 1/2004 | Fujimori | 705/57 |
| 6,701,440 | B1 * | 3/2004 | Kim et al. | 726/24 |
| 6,714,970 | B1 * | 3/2004 | Fiveash et al. | 709/219 |
| 6,772,349 | B1 * | 8/2004 | Martin et al. | 726/22 |
| 6,789,203 | B1 * | 9/2004 | Belissent | 726/22 |
| 6,795,846 | B1 * | 9/2004 | Merriam | 709/203 |
| 6,883,101 | B1 * | 4/2005 | Fox et al. | 726/25 |
| 6,886,044 | B1 * | 4/2005 | Miles et al. | 709/238 |
| 6,889,168 | B1 * | 5/2005 | Hartley et al. | 702/186 |

(Continued)

FOREIGN PATENT DOCUMENTS

WO 97/12321 4/1997

(Continued)

OTHER PUBLICATIONS

Phrack Magazine "The Art of Port Scanning" Sep. 01, 1997, vol. 7.*

*Primary Examiner*—Nasser Moazzami
*Assistant Examiner*—Eleni Shiferaw
(74) *Attorney, Agent, or Firm*—Zilka-Kotab, PC; Christopher J. Hamaty

(57) ABSTRACT

A system, method and computer program product are provided for detecting modifications to risk assessment scanning caused by an intermediate device. Initially, a risk assessment scan is initiated on a target from a remote source utilizing a network. Next, it is determined whether the risk assessment scan involves an intermediate device coupled between the target and the remote source. Results of the risk assessment scan are then received from the target utilizing the network. If it is determined that the risk assessment scan involves the intermediate device, an administrator is notified for executing additional security measures.

33 Claims, 7 Drawing Sheets

U.S. PATENT DOCUMENTS

| | | |
|---|---|---|
| 2001/0034847 A1* | 10/2001 | Gaul, Jr. .................... 713/201 |
| 2002/0002686 A1* | 1/2002 | Vange et al. ................ 713/201 |
| 2002/0073333 A1* | 6/2002 | Palka et al. ................. 713/201 |
| 2002/0083339 A1* | 6/2002 | Blumenau et al. .......... 713/201 |
| 2002/0143963 A1* | 10/2002 | Converse et al. ........... 709/229 |
| 2002/0199114 A1* | 12/2002 | Schwartz .................... 713/201 |
| 2003/0028803 A1* | 2/2003 | Bunker et al. .............. 713/201 |
| 2003/0033486 A1* | 2/2003 | Mizrachi et al. ............ 711/133 |
| 2004/0181694 A1* | 9/2004 | Cox et al. ................... 713/201 |

FOREIGN PATENT DOCUMENTS

| | | |
|---|---|---|
| WO | 99/26161 | 5/1999 |
| WO | 01/04753 A1 | 1/2001 |

* cited by examiner

SYSTEM, METHOD AND COMPUTER PROGRAM PRODUCT FOR DETECTING MODIFICATIONS TO RISK ASSESSMENT SCANNING CAUSED BY AN INTERMEDIATE DEVICE

FIELD OF THE INVENTION

The present invention relates to risk assessment scanners, and more particularly to enhancing the quality of risk assessment scanning.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is on-going, ever changing, and an increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capability in order to cause denial of service; and so forth.

Network security risk-assessment tools, i.e. "scanners," may be used by a network manager to simulate an attack against computer systems via a remote connection. Such scanners can probe for network weaknesses by simulating certain types of security events that make up an attack. Such tools can also test user passwords for suitability and security. Moreover, scanners can search for known types of security events in the form of malicious programs such as viruses, worms, and Trojan horses.

During the course of scanning, such security risk-assessment tools often open remote network connections to various target computer systems. Most of these connections rely on Transmission Control Protocol/Internet Protocol (TCP/IP) connectivity to establish communications, and test for security risks using scan-related data. When scanning the target computer systems in such a manner, it is important that the scan-related data be communicated directly with the target computer systems. Modification of the scan-related data may result in inaccurate results, including failure to identify known security vulnerabilities on the target computer system being tested.

One common source of data modification is a proxy server that may be arbitrating requests to and/or from the target computer systems. There is thus a need for a technique of identifying the presence of such proxy servers to prompt administrators or auditors to take additional steps to accurately assess the risk of potentially vulnerable target computer systems.

DISCLOSURE OF THE INVENTION

A system, method and computer program product are provided for detecting modifications to risk assessment scanning caused by an intermediate device. Initially, a risk assessment scan is initiated on a target from a remote source utilizing a network. Next, it is determined whether the risk assessment scan involves an intermediate device coupled between the target and the remote source. Results of the risk assessment scan are then received from the target utilizing the network. If it is determined that the risk assessment scan involves the intermediate device, an administrator is notified for executing additional security measures.

In one embodiment, the intermediate device may include a router or a proxy server. Further, a plurality of procedures may be utilized to determine whether the risk assessment scan involves the intermediate device.

In one aspect of the present embodiment, at least one of the procedures may utilize an ip_ttl (time-to-live) flag and/or tcp_win (TCP window size) flag to determine whether the risk assessment scan involves the intermediate device. In particular, a port list associated with the risk assessment scan may be first identified after which a plurality of connection attempts may be communicated utilizing at least two ports on the port list. It may then be determined whether a value of the flag(s) is different for the connection attempts. If the value of the flag(s) is different for the communication attempts using the at least two ports on the port list, it may be indicated that the risk assessment scan involves the intermediate device.

In another aspect of the present embodiment, at least one of the procedures may request content and cached content from the target. —In some cases, cached content stored on an intermediate device may differ from versions of content stored on the target. As such, a first request for content may be transmitted to the target utilizing the network, and a second request for a cached version of the content may be transmitted to the target utilizing the network. As an option, the cached content may be requested from the target utilizing a "via" tag. The responses to the first and second requests may then be analyzed. If the responses to the requests are different, it may be indicated that the risk assessment scan involves the intermediate device.

In still another aspect of the present embodiment, at least one of the procedures may transmit a request without specifying a "host" header value. Typically, an intermediate device such as a proxy server that conforms to the HTTP/1.1 specification, but not necessarily the HTTP/1.0 specification, responds to such a request with an error message. As such, it may be indicated that the risk assessment scan involves the intermediate device if a response to the request includes the error message.

DESCRIPTION OF THE PREFERRED EMBODIMENTS

Figure 1:
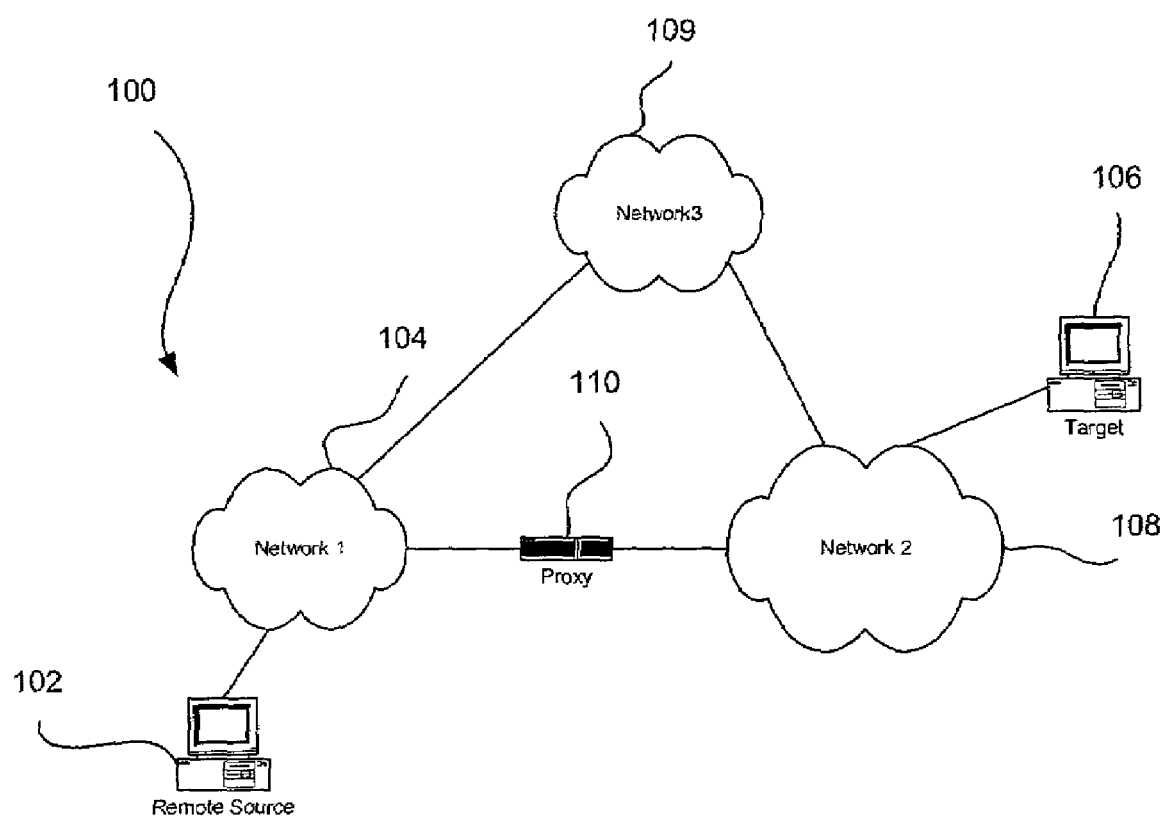
FIG. 1 illustrates a network architecture, in accordance with the one embodiment.

FIG. 1 illustrates a network architecture 100, in accordance with the one embodiment. As shown, a remote source 102 is provided which is coupled to a first network 104. Also included is at least one target 106 coupled to a second network 108. It should be noted that various other networks 109 may also be included. In the context of the present network architecture 100, the networks 104, 108, and 109 may each take any form including, but not limited to a local area network (LAN), a wide area network (WAN) such as the Internet, etc. Further, the target 106 may include a web server, desktop computer, lap-top computer, hand-held computer, printer or any other type of hardware/software.

In use, the remote source 102 may attempt to access the target 106 by way of an intermediate device 110 coupled between the first network 104 and the second network 108 for communication purposes, i.e. executing a scanning procedure. In the context of the present description, the intermediate device 110 may include, but is not limited to a proxy server, router, or any device capable of modifying data passing therethrough. It should be understood that the intermediate device 110 need not necessarily be used for communication between the remote source 102 and the target 106. Instead, the other networks 109 may be employed based on a desired pathway for communications.

Figure 2:
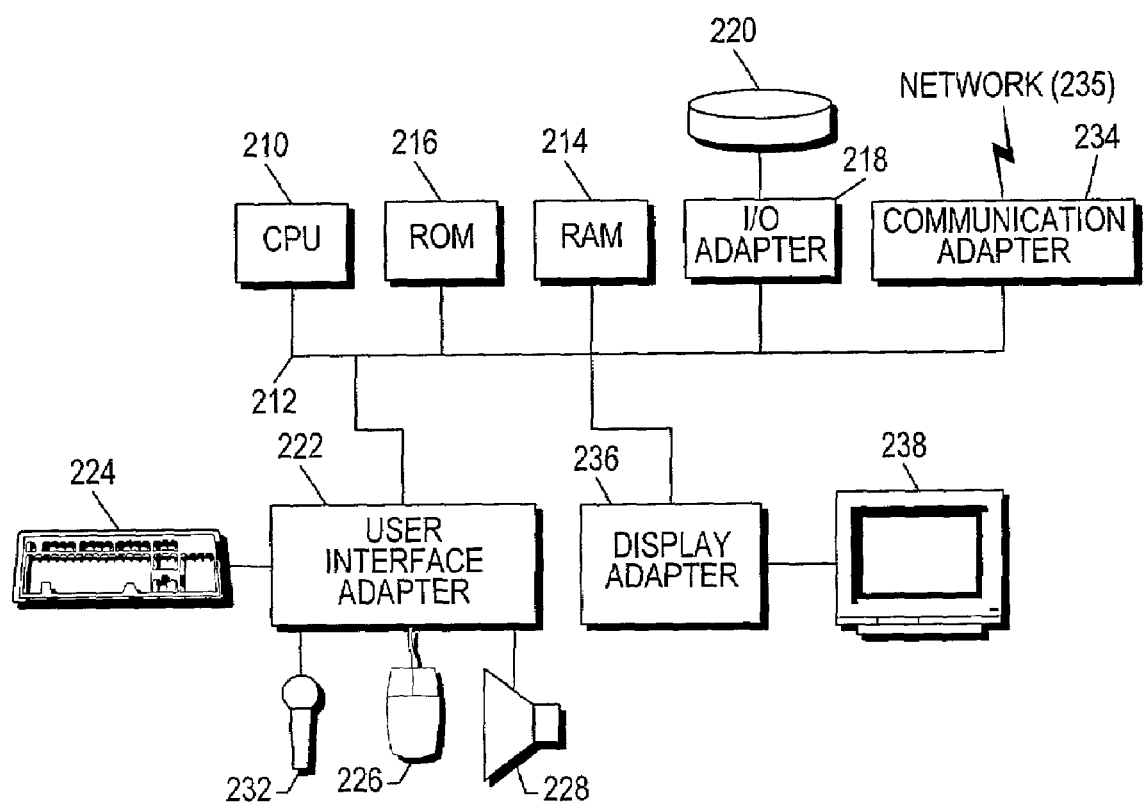
FIG. 2 shows a representative hardware environment that may be associated with the remote source and/or target of FIG. 1.

FIG. 2 shows a representative hardware environment that may be associated with the remote source 102 and/or target 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
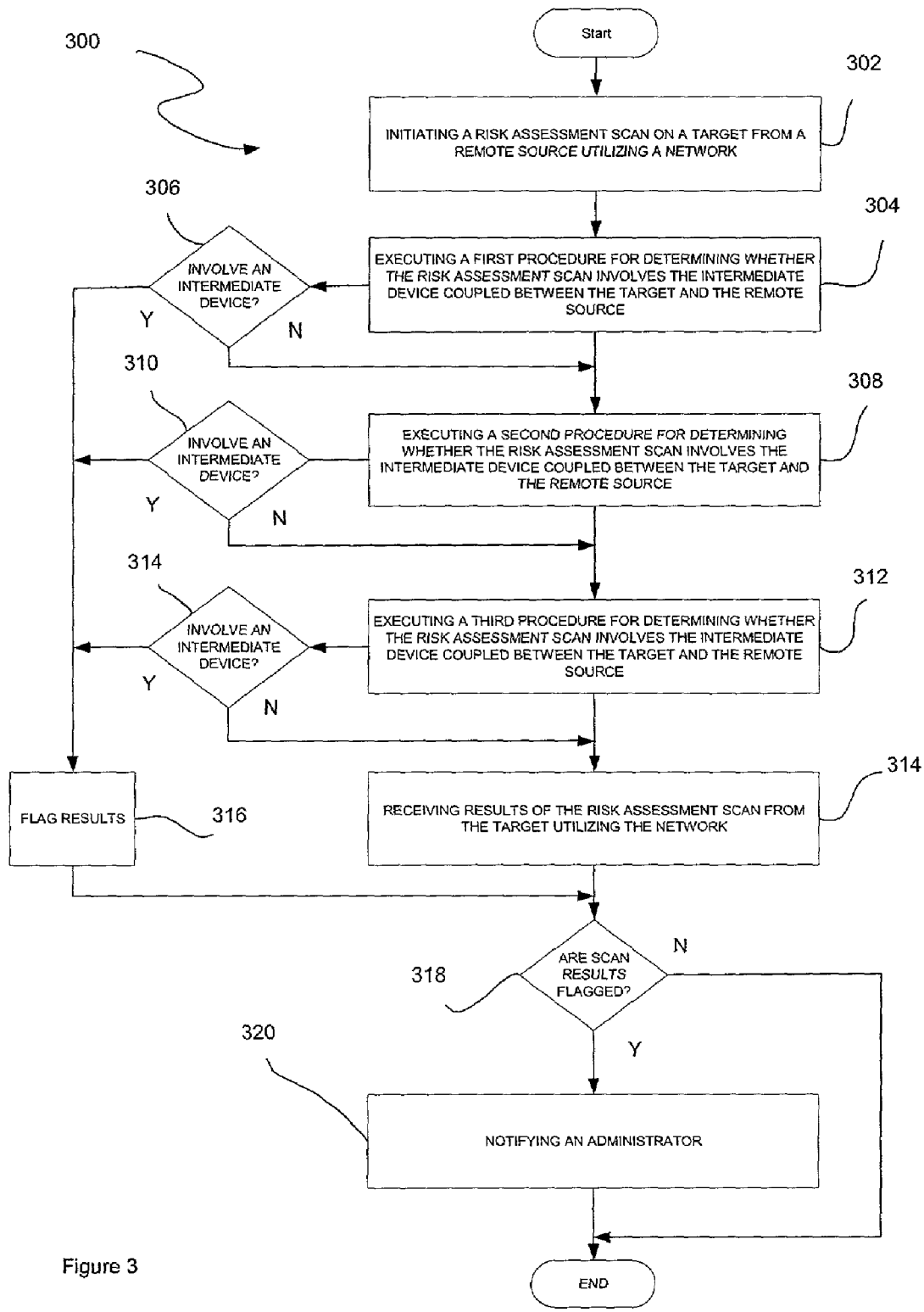
FIG. 3 illustrates a method for detecting modifications to risk assessment scanning caused by an intermediate device.

FIG. 3 illustrates a method 300 for detecting modifications to risk assessment scanning caused by the intermediate device 110. In one embodiment, such method 300 may be carried out by the remote source 102 that is executing the scanning procedure. It should be noted, however, that the method 300 may be carried out by any desired device in any desired relation to the remote source 102.

Initially, in operation 302, a risk assessment scan is initiated on the target 106 from the remote source 102 utilizing at least one of the networks 104, 108, and 109. In the context of the present invention, the risk assessment scan may include any techniques for protecting the target 106 from attacks or intrusions on the vulnerabilities thereof. Such vulnerabilities may include any aspect of the target 106 that would make it susceptible to an attack or intrusion by a hacker.

Next, in operation 304, a first procedure is executed for determining whether the risk assessment scan involves the intermediate device 110 coupled between the target 102 and the remote source 104. Based on this first procedure, it can be decided in decision 306 as to whether the risk assessment scan involves the intermediate device 110. If it can not be decided whether the intermediate device 110 is involved, the present method 300 carries out operation 308. More information regarding the first procedure will be set forth hereinafter in greater detail during reference to FIG. 4.

In operation 308, a second procedure distinct from the first procedure is executed for determining whether the risk assessment scan involves the intermediate device 110. Based on the second procedure, it can be decided in decision 310 as to whether the risk assessment scan involves the intermediate device 110. If it can not be decided in decision 310 whether the intermediate device 110 is involved, the present method 300 carries out operation 312. More information regarding the second procedure will be set forth hereinafter in greater detail during reference to FIG. 7.

A unique third procedure is executed in operation 312 for determining whether the risk assessment scan involves the intermediate device 110. Based on the third procedure, it can be decided in decision 314 as to whether the risk assessment scan involves the intermediate device 110. If it can not be decided in decision 314 whether the intermediate device 110 is involved, the present method 300 carries out operation 314. More information regarding the third procedure will be set forth hereinafter in greater detail during reference to FIG. 8.

It should be noted that any greater or lesser number of procedures may be used in the context of the present embodiment. While an increase in the number of executed procedures would increase the certainty of determining the involvement of the intermediate device 110, it would also increase a latency associated with the risk assessment scan. Conversely, a decrease in the number of executed procedures would decrease the certainty of determining the involvement of the intermediate device 110, while decreasing the latency associated with the risk assessment scan. It should be further understood that operations 304–314 may be carried out in any desired order with respect to each other, and the other operations of the method 300 of FIG. 3.

With continuing reference to FIG. 3, results of the risk assessment scan are received from the target 106 utilizing at least one of the networks 104, 108, and 109 in operation 314. If, in decisions 306, 310 or 314, it is determined that the risk assessment scan involves the intermediate device 110, such results may be flagged in accordance with operation 316. In one embodiment, the results may include a data structure that reserves a dedicated flag for indicating whether the results involve the intermediate device 110.

If it is determined that the risk assessment scan involves the intermediate device 110 in decision 318, an administrator is notified for executing additional security measures. See operation 320. The notification may take any form including, but not limited to e-mail, facsimile, a web-site, or any other type of communication. Further, the additional security measure may include additional scans in an attempt to secure a direct connection with the target 106. In the alternative, the administrator can notify the target 106 of the possibility of undetected vulnerabilities, etc. Still yet, the administrator may take any measure to test or alert others as to the authenticity of the risk assessment scanning.

Figure 4:
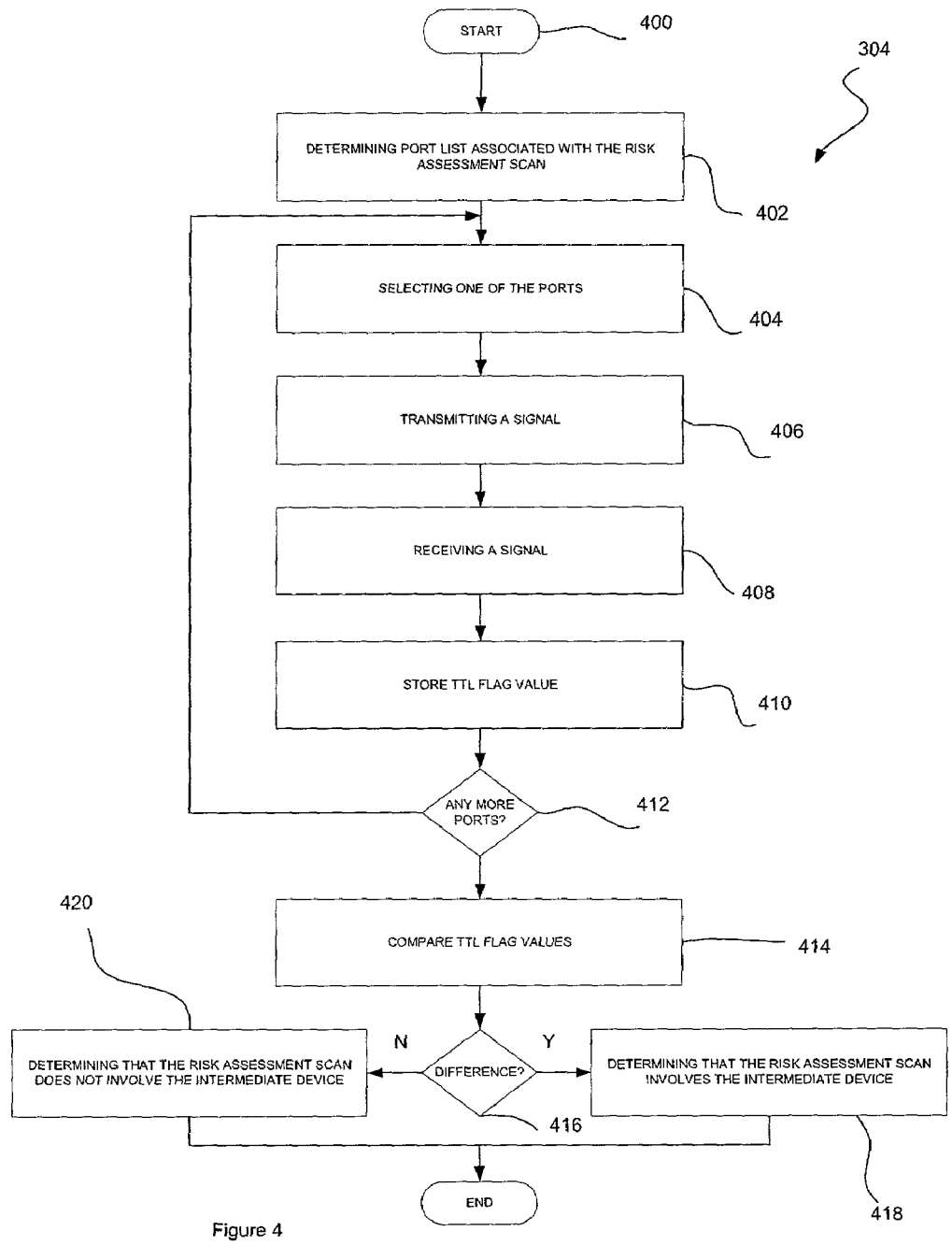
FIG. 4 illustrates a first procedure for determining whether a risk assessment scan involves the intermediate device, in accordance with FIG. 3.

FIG. 4 illustrates a first procedure 400 for determining whether a risk assessment scan involves the intermediate device 110, in accordance with operation 304 of FIG. 3. In particular, the first procedure 400 utilizes the well known time-to-live (ip_jtl) flag and/or TCP window size (tcp_win) flag to determine whether the risk assessment scan involves the intermediate device 110.

As is well known in the art, an ip_ttl flag is a value tracked by Transmission Control Protocol/Internet Protocol (TCP/IP) that indicates a number of intermediate devices traversed during a transmission utilizing the Internet. One well known use for such flag is to detect a situation where a message is being sent repeatedly back and forth between two misconfigured routers. In such a situation, the ip_ttl flag may be decremented at each traversal of the routers. To this end, the message may be abandoned after the ip_ttl flag value reaches a predetermined value. This avoids infinite message relays.

The tcp_win flag is similarly useful in that it allows one to determine when a message has been altered during a transmission. In particular, tcp_win settings may vary between operating systems, and potentially between differently configured instances of similar operating systems. By sending data to several ports on the target 106, values of the tcp_win flag may be compared and, if values are different, it may be inferred that the intermediate device 110 has intercepted some of the data.

Initially, in operation 402, a port list associated with the risk assessment scan is first identified. It is well known that risk assessment scans often access different ports during a scan. Once the list has been identified, one of the ports is selected from the list in operation 404. Using such selected port, a signal is sent by the remote source 102 in operation 406. It should be noted that the initial ip_ttl flag value is reset prior to the transmission of the signal. In one embodiment, such signal may include a connection attempt, or any signal that elicits a response from the target 106.

Next, in operation 408, a response signal is received from the target 106. Upon receipt, the current ip_ttl flag value is stored in operation 410. Thereafter, at least one other port is selected as a function of decision 412, and operations 404–410 are repeated for the new port. While at least two transmissions using at least two different ports are necessary, more ports may be utilized per the desires of the user.

Figure 5:
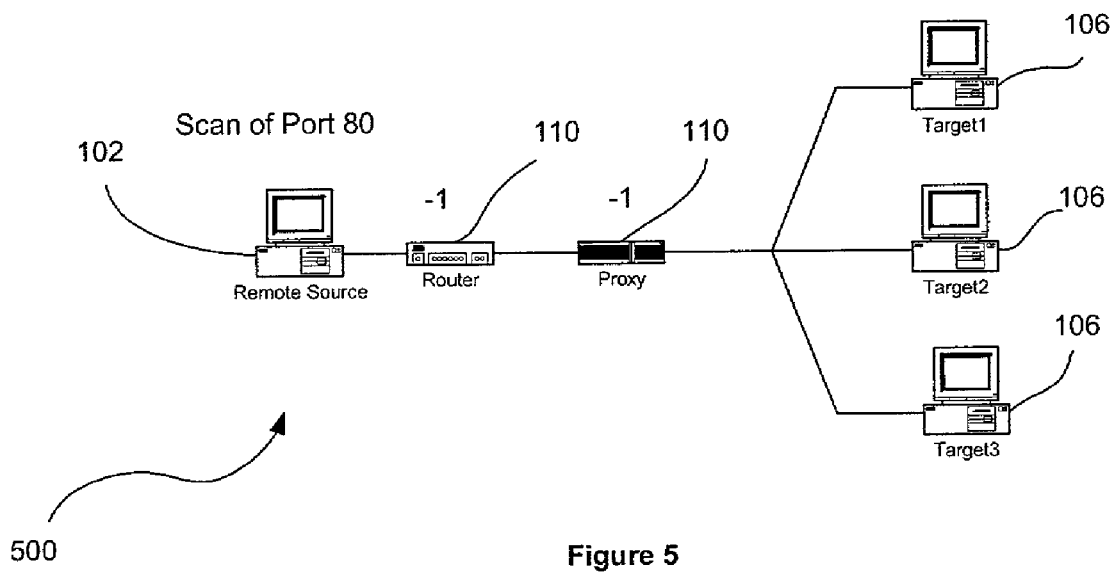
FIGS. 5 and 6 illustrate examples of how a proxy server will decrement an ip_ttl flag value for a first port, and not decrement the ip_ttl flag value for a second port.
Figure 6:
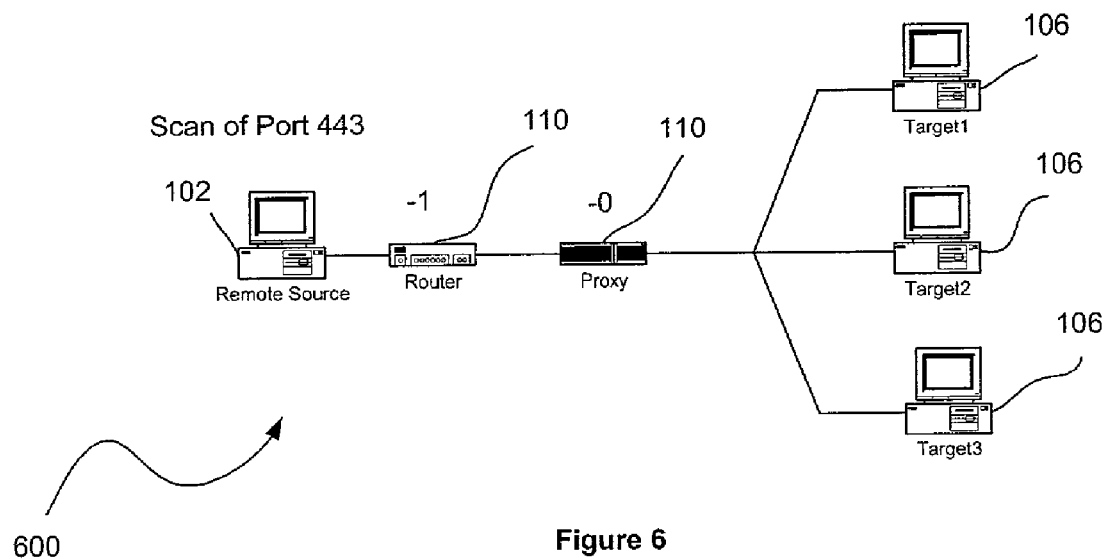

Intermediate devices such as proxy servers often decrement the ip_ttl flag value for only transmissions involving certain ports. As such, transmissions including different ports often render differing ip_ttl flag values when a proxy server is involved. FIGS. 5 and 6 illustrate examples 500 and 600 of how a proxy server 110 will decrement the ip_ttl flag value for a first port, i.e. 80, and not decrement the ip_ttl flag value for a second port, i.e. 443.

As such, after at least two current ip_ttl flag values are stored, a comparison of such values may be performed in operation 414. If it is determined in decision 416 that the values of the flag(s) are different for the signals communicated in operations 406–408, it may be indicated that the risk assessment scan involves the intermediate device 110. Note operation 418. If not, it may be indicated that the risk assessment scan does not involve the intermediate device 110 in operation 420.

Figure 7:
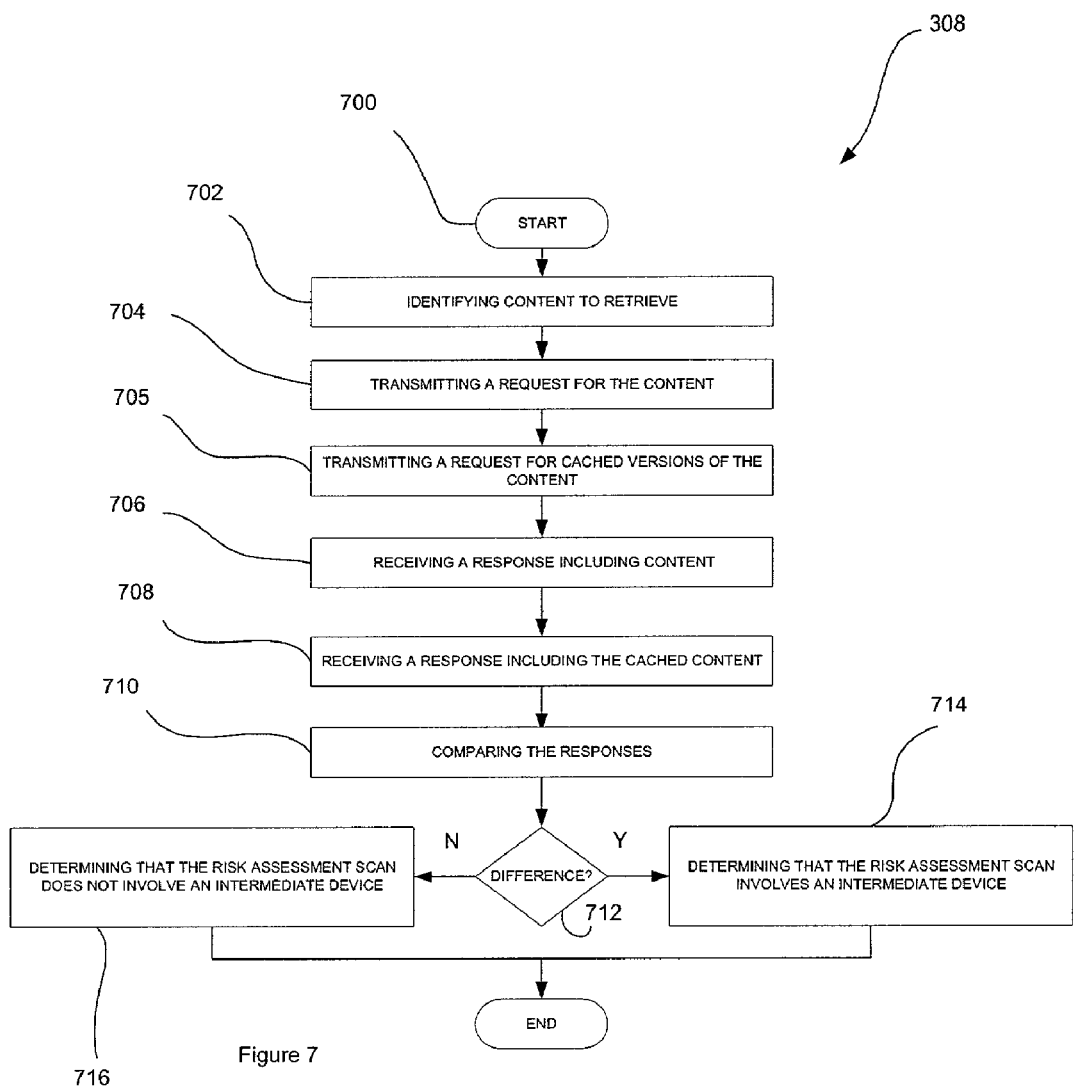
FIG. 7 illustrates a second procedure for determining whether a risk assessment scan involves the intermediate device, in accordance with FIG. 3.

FIG. 7 illustrates a second procedure 700 for determining whether a risk assessment scan involves the intermediate device 110, in accordance with operation 308 of FIG. 3. Such second procedure 700 involves requesting content and cached content from the target 106 in order to determine the involvement of the intermediate device 110. The present procedure 700 is made possible since cached content that passes through an intermediate device such as a proxy server may differ from actual content stored on the target 106.

Initially, in operation 702, content is identified which is to be retrieved. For the purpose of the present description, any content is suitable. Thereafter, in operation 704, a first request signal is transmitted by the remote source 102 for content from the target 106 utilizing at least one of the networks 104, 108, and 109. Also sent is a second request signal requesting a cached version of the content from the target 106. See operation 705. As an option, the cached content may be requested from the target 106 utilizing a "via" tag. Via tags is a well known TCP/IP tool for obtaining cached content utilizing the Internet.

The responses to the first and second requests are received in operations 706 and 708, and then compared in operation 710. If the responses to the requests are different according to decision 712, it may be indicated that the risk assessment scan involves the intermediate device 110. Note operation 714. It should be noted that such responses may be different in various aspects. For example, content that frequently changes, or that contains date or time information, will reflect these differences between cached and original versions. If there is no difference, it may be indicated that the risk assessment scan does not involve the intermediate device 110 in operation 716.

Figure 8:
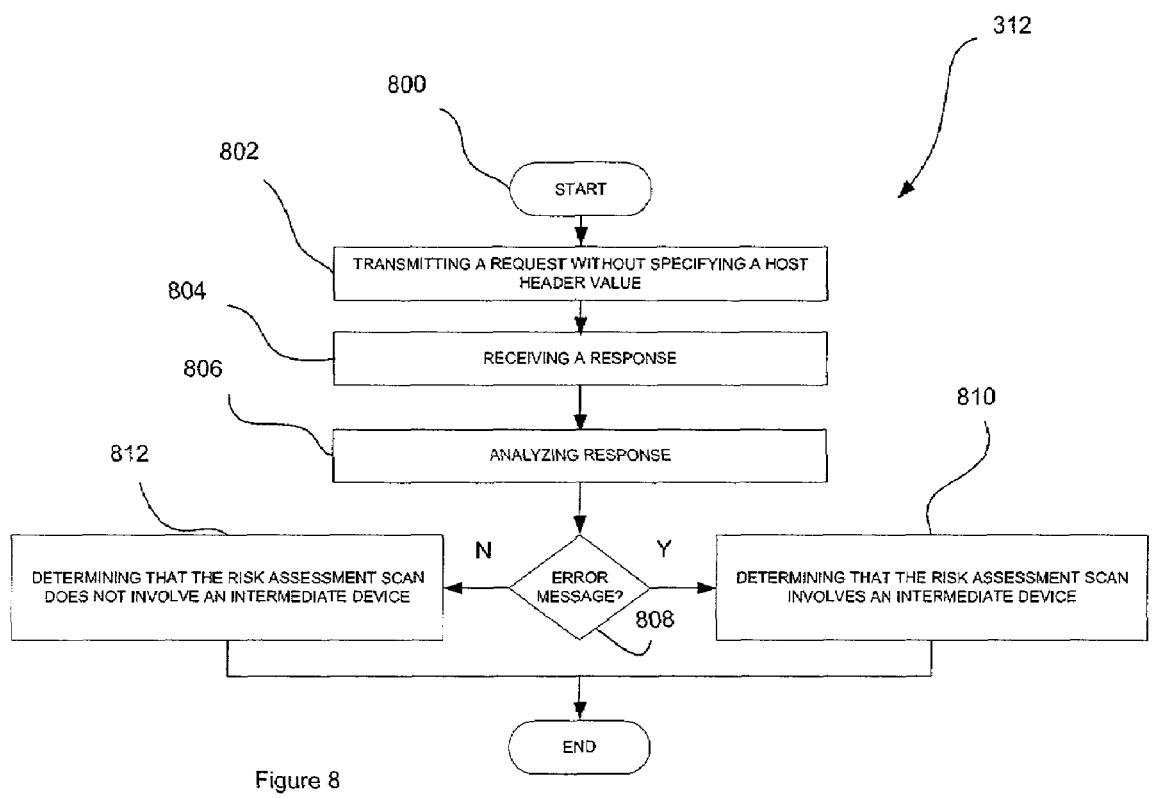
FIG. 8 illustrates a third procedure for determining whether a risk assessment scan involves the intermediate device, in accordance with FIG. 3.

FIG. 8 illustrates a procedure method 800 for determining whether a risk assessment scan involves the intermediate device 110, in accordance with operation 312 of FIG. 3. The present procedure 800 involves a host header value that is commonly included in TCP/IP transmissions to identify the target 106 to which a transmission is destined.

In operation 802, the remote source 102 transmits a request of any type without specifying a "Host:" header value. Typically, an HTTP/1.1-compliant intermediate device 110 such as a proxy server responds to such a request with an error message. A response to the request is then received in operation 804 and analyzed in operation 806.

If decision 808 finds that an error message is received as a result of the analysis, it may be indicated that the risk assessment scan involves the intermediate device 110. Note operation 810. If not, it may be indicated that the risk assessment scan does not involve the intermediate device 110 in operation 812.

The foregoing embodiments thus recognize that a proxy server and other intermediate devices 110 may be a source of data modification when arbitrating requests to and/or from the target 106 during risk assessment scanning. Knowledge of the presence of such intermediate devices 110 allows administrators and/or auditors to take additional steps to accurately assess the risk of potentially vulnerable targets 106.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting modifications to risk assessment scanning caused by an intermediate device, comprising:
    (a) initiating a risk assessment scan at and on a target, from a remote source utilizing a network;
    (b) determining whether the risk assessment scan at and on the target involves an intermediate device coupled between the target and the remote source;
    (c) receiving results of the risk assessment scan from the target utilizing the network; and
    (d) notifying an administrator if it is determined that the risk assessment scan at and on the target involves the intermediate device, wherein additional operations are carried out to improve a risk assessment at and on the target in view of the presence of the intermediate device coupled between the target and the remote source;
    wherein a plurality of procedures are utilized to determine whether the risk assessment scan involves the intermediate device;
    wherein at least one of the procedures includes transmitting a first request for content to the target utilizing the network, and transmitting a second request for a cached version of the content to the target utilizing the network; and
    wherein at least one of the procedures further includes analyzing responses to the first and second requests.

2. The method as recited in claim 1, wherein the intermediate device includes a router.

3. The method as recited in claim 1, wherein the at least one of the procedures includes determining a port list associated with the risk assessment scan.

4. The method as recited in claim 3, wherein the at least one of the procedures further includes determining whether a value of a flag is different for communication attempts using at least two ports on the port list.

5. The method as recited in claim 4, wherein the flag includes an ip_ttl flag.

6. The method as recited in claim 4, wherein the flag includes a tcp_win flag.

7. The method as recited in claim 4, wherein the communications include connection attempts between the remote source and the target utilizing the network.

8. The method as recited in claim 4, wherein the at least one of the procedures further includes indicating that the risk assessment scan involves the intermediate device if the value of the flag is different for the communication attempts using the at least two ports on the port list.

9. The method as recited in claim 1, wherein the cached content is requested from the target utilizing a via tag.

10. The method as recited in claim 1, wherein the at least one of the procedures further includes indicating that the risk assessment scan involves the intermediate device based on the analysis.

11. The method as recited in claim 1, wherein the at least one of the procedures further includes indicating that the risk assessment scan involves the intermediate device if the responses to the requests are different.

12. The method as recited in claim 1, wherein the at least one of the procedures includes transmitting a request without specifying a host header value.

13. The method as recited in claim 12, wherein the at least one of the procedures further includes identifying an error message in response to the request.

14. The method as recited in claim 13, wherein the at least one of the procedures includes indicating that the risk assessment scan involves the intermediate device if the response includes the error message.

15. The method as recited in claim 1, wherein the intermediate device includes a proxy server.

16. A computer program product for detecting modifications to risk assessment scanning caused by an intermediate device, comprising:
    (a) computer code for initiating a risk assessment scan at and on a target, from a remote source utilizing a network;
    (b) computer code for determining whether the risk assessment scan at and on the target involves an intermediate device coupled between the target and the remote source;
    (c) computer code for receiving results of the risk assessment scan from the target utilizing the network; and
    (d) computer code for notifying an administrator if it is determined that the risk assessment scan at and on the target involves the intermediate device;
    wherein additional operations are carried out to improve a risk assessment at and on the target in view of the presence of the intermediate device coupled between the target and the remote source;
    wherein a plurality of procedures are utilized to determine whether the risk assessment scan involves the intermediate device;
    wherein at least one of the procedures includes transmitting a first request for content to the target utilizing the network, and transmitting a second request for a cached version of the content to the target utilizing the network; and
    wherein at least one of the procedures further includes analyzing responses to the first and second requests.

17. The computer program product as recited in claim 16, wherein the intermediate device includes a router.

18. The computer program product as recited in claim 16, wherein the intermediate device includes a proxy server.

19. The computer program product as recited in claim 16, wherein the at least one of the procedures includes determining a port list associated with the risk assessment scan.

20. The computer program product as recited in claim 19, wherein the at least one of the procedures further includes determining whether a value of a flag is different for communication attempts using at least two ports on the port list.

21. The computer program product as recited in claim 20, wherein the flag includes an ip_ttl flag.

22. The computer program product as recited in claim 20, wherein the flag includes a tcp_win flag.

23. The computer program product as recited in claim 20, wherein the communications include connection attempts between the remote source and the target utilizing the network.

24. The computer program product as recited in claim 20, wherein the at least one of the procedures further includes indicating that the risk assessment scan involves the intermediate device if the value of the flag is different for the communication attempts using the at least two ports on the port list.

25. The computer program product as recited in claim 16, wherein the cached content is requested from the target utilizing a via tag.

26. The computer program product as recited in claim 1, wherein the at least one of the procedures further includes indicating that the risk assessment scan involves the intermediate device based on the analysis.

27. The computer program product as recited in claim 1, wherein the at least one of the procedures further includes indicating that the risk assessment scan involves the intermediate device if the responses to the requests are different.

28. The computer program product as recited in claim 16, wherein the at least one of the procedures includes transmitting a request without specifying a host header value.

29. The computer program product as recited in claim 28, wherein the at least one of the procedures further includes identifying an error message in response to the request.

30. The computer program product as recited in claim 29, wherein the at least one of the procedures includes indicating that the risk assessment scan involves the intermediate device if the response includes the error message.

31. A system for detecting modifications to risk assessment scanning caused by an intermediate device, comprising:
   (a) logic for initiating a risk assessment scan at and on a target, from a remote source utilizing a network;
   (b) logic for determining whether the risk assessment scan at and on the target involves an intermediate device coupled between the target and the remote source;
   (c) logic for receiving results of the risk assessment scan from the target utilizing the network; and
   (d) logic for notifying an administrator if it is determined that the risk assessment scan at and on the target involves the intermediate device;
      wherein additional operations are carried out to improve a risk assessment at and on the target in view of the presence of the intermediate device coupled between the target and the remote source;
      wherein a plurality of procedures are utilized to determine whether the risk assessment scan involves the intermediate device;
      wherein at least one of the procedures includes transmitting a first request for content to the target utilizing the network, and transmitting a second request for a cached version of the content to the target utilizing the network; and
      wherein at least one of the procedures further includes analyzing responses to the first and second requests.

32. A method for detecting modifications to risk assessment scanning caused by a proxy server, comprising:
   (a) initiating a risk assessment scan at and on a target, from a remote source utilizing a network;
   (b) executing a plurality of procedures to determine whether the risk assessment scan at and on the target involves a proxy server coupled between the target and the remote source;
   (c) said procedures utilizing a plurality of parameters selected from the group consisting of an ip ttl flag, a tcp_win flag, a via tag, and a host header value;
   (d) receiving results of the risk assessment scan from the target utilizing the network;
   (e) flagging the results of the risk assessment scan if at least one of the procedures indicates that the risk assessment scan involves a proxy server coupled between the target and the remote source; and
   (f) notifying an administrator if the results of the risk assessment scan at and on the target are flagged;
      wherein additional operations are carried out to improve a risk assessment at and on the target in view of the presence of the proxy server coupled between the target and the remote source;
      wherein at least one of the procedures includes transmitting a first request for content to the target utilizing the network, and transmitting a second request for a cached version of the content to the target utilizing the network; and
      wherein at least one of the procedures further includes analyzing responses to the first and second requests.

33. A computer program product for detecting modifications to risk assessment scanning caused by a proxy server, comprising:
   (a) computer code for initiating a risk assessment scan at and on a target, from a remote source utilizing a network;
   (b) computer code for executing a plurality of procedures to determine whether the risk assessment scan at and on the target involves a proxy server coupled between the target and the remote source;
   (c) said procedures utilizing a plurality of parameters selected from the group consisting of an ip_ttl flag, a tcp win flag, a via tag, and a host header value;
   (d) computer code for receiving results of the risk assessment scan from the target utilizing the network;
   (e) computer code for flagging the results of the risk assessment scan if at least one of the procedures indicates that the risk assessment scan involves a proxy server coupled between the target and the remote source;
   (f) computer code for notifying an administrator if the results of the risk assessment scan at and on the target are flagged;
      wherein additional operations are carried out to improve a risk assessment at and on the target in view of the presence of the proxy server coupled between the target and the remote source;
      wherein at least one of the procedures includes transmitting a first request for content to the target utilizing the network, and transmitting a second request for a cached version of the content to the target utilizing the network; and
      wherein at least one of the procedures further includes analyzing responses to the first and second requests.

* * * * *